United States Patent [19]

Lee

[11] 4,256,677
[45] Mar. 17, 1981

[54] APPARATUS AND METHOD FOR MAKING SMALL SPHERES

[75] Inventor: Lawrence L. Lee, Fort Wayne, Ind.

[73] Assignee: Magnavox Government and Industrial Electronics Co., Fort Wayne, Ind.

[21] Appl. No.: 675,860

[22] Filed: Apr. 12, 1976

[51] Int. Cl.³ .............................................. B01J 2/14
[52] U.S. Cl. ......................................... 264/8; 425/8
[58] Field of Search ................................ 264/8; 425/8

[56] References Cited

U.S. PATENT DOCUMENTS

| 1,939,391 | 12/1933 | Curran | 264/8 |
| 2,543,069 | 2/1951 | Shabaker | 264/8 |
| 2,897,539 | 8/1959 | McMillan | 264/8 |
| 3,499,745 | 3/1970 | Plumat | 264/8 |
| 3,721,511 | 3/1973 | Schlienger | 264/8 |
| 3,887,667 | 6/1975 | Clark | 264/8 |

Primary Examiner—Donald E. Czaja
Assistant Examiner—James R. Hall
Attorney, Agent, or Firm—William J. Iseman; William J. Streeter; Thomas A. Briody

[57] ABSTRACT

Apparatus and method for making small spherical particles comprising rotating a toothed disc at a constant speed. Heating means are provided to heat the spinning toothed disc so that when material from which the particles are to be made touches the toothed disc the material will melt and migrate to the teeth and form beads on the teeth. As the tooth disc rotates, centrifugal force causes the beads to be thrown off and form spheres as the falling beads cool off and re-solidify.

15 Claims, 4 Drawing Figures

APPARATUS AND METHOD FOR MAKING SMALL SPHERES

BACKGROUND OF THE INVENTION

The present invention relates to a method and apparatus for making small spherical particles. More particularly, the present invention relates to an inexpensive means to produce small solid spherical particles such as can be used in a magnetic particle display panel disclosed in my copending patent application Ser. No. 566,455 filed Apr. 9, 1975 now abandoned.

The magnetic particles required for use in the magnetic display panel disclosed in my above mentioned copending patent application must be substantially spherical in shape and of uniform size. A large number of these particles would be required in the display panel to provide desired resolution. It is therefore desirable to produce spherical particles of substantially uniform diameter in great quantities and at low cost. The magnetic particles required for the magnetic particle display panel are typically less than 200 microns in diameter.

Most of the techniques proposed in the past for generating solid particles are limited by the control which can be exercised over the physical parameters of the particles generated, especially when the parameter in question is particle uniformity. One system proposed in the past is a liquid droplet generator which makes use of the so called Rayleigh mechanism. With this mechanism, droplets are generated by the electromechanical excitation of a liquid jet issuing from an orifice, resulting in the break up of the jet into drops. The drops are formed in a single stream and are easily controlled, equally spaced, and exhibit a remarkable degree of uniformity in size. The Rayleigh mechanism has been used for generation of solid spheres of approximately 200 microns diameter by breaking up a jet of material in its molten state and solidifying it by cooling after the particles are formed. This method, however, is limited by difficulties in producing droplets of highly viscous fluids and by the collection of impurities at the capillary openings when very small capillaries are used. Furthermore, this method does not produce suitable particles when liquids containing a high concentration of solid particles which have a tendency to settle out are used. It therefore becomes rather difficult to produce solid spheres of small size with ease.

Also in the past there have been methods proposed for forming filamentary materials from a molten material. A stream of the molten material is directed onto an outer circumferential boundary of a rotating member having grooves or indentations formed in the outer circumferential boundary. The rotating member serves as a chill block to remove the heat from the molten material thereby solidifying the material and forming it into solidified filaments. The movement of the chill block is disposed to effect the ejection of the solidified molten stream from the grooves or indentations in the form of filaments by centrifugal force. However, it should be recognized that these methods do not lend themselves to making small spherical particles.

Spherical particles of polyethylene with carbon-black filler (10% by weight) have been made by emulsifying ultrasonically polyethylene and carbon-black in a boiling solution of water, glycerol, and sodium lauryl sulfate. Then quenching the emulsion by pouring quickly into water and stirring rapidly. The particles ranged over a wide distribution of sizes. Furthermore, this method would probably not work well when a high concentration of filler material is needed, or when the filler material separates easily from the binder.

In view of the foregoing, it should now be understood that it would be desirable to provide an improved method and apparatus for producing small spherical particles that would solve the above and other problems.

Accordingly, one of the objects of the present invention is to provide an apparatus for making small solid particles of uniform size and/or of uniform density.

Another object of the invention is to provide an improved apparatus that employs a heated disc to make small solid spherical particles and eliminates the requirement of capillary tubes which are subject to clogging.

Yet another object of the present invention is to provide a method that employs relatively inexpensive and easily operable equipment to make small solid particles.

SUMMARY OF THE INVENTION

In carrying out the above and other objects of the invention in one form, I provide an improved apparatus for making substantially spherical particles from a meltable material. One illustrated embodiment has means to rotate a rotatable wheel. Also provided are heating means to heat the rotatable wheel so that when material from which particles are to be made comes in contact with the rotatable wheel the material will melt. As the material melts, the rotation of the wheel will cause the material to migrate to the outer periphery of the wheel. The centrifugal force caused by the rotation of the wheel will eventually cause the material to be thrown off in the form of droplets. Surface tension causes these free-falling droplets to assume the shape of a sphere. As the droplets cool, they solidify into substantially perfectly round solid spheres. Means to collect these spheres is placed a sufficient distance from the wheel so that the droplets will have a chance to solidify before coming in contact with the collector.

A method of making particles that are substantially uniform in size, shape, or composition from a predetermined material is also provided. The method comprises spinning a disc about a substantially vertical axis that passes through the center of the disc. The method also comprises placing the predetermined material on to the spinning disc, so that the material will migrate towards the outer periphery of the disc and be thrown off by centrifugal force. As the material is thrown off the disc it forms into droplets. The droplets will solidify into the desired particles as they fall.

The subject matter which I regard as my invention is set forth in the appended claims. The invention itself, however, together with further objects and advantages thereof, may be better understood by referring to the following detailed description taken in conjunction with the accompanying drawings.

Figure 1:
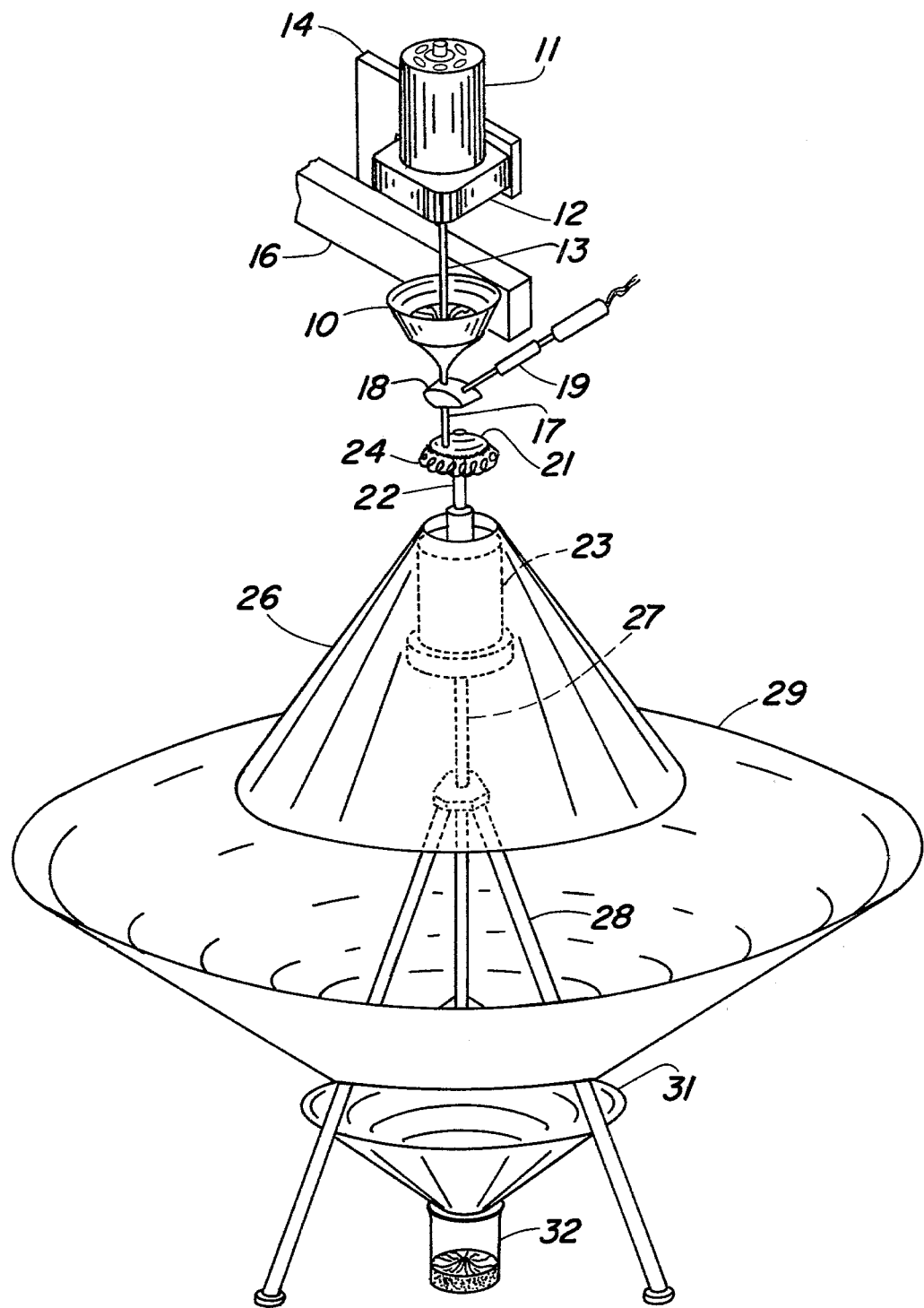
FIG. 1 illustrates in one form an embodiment of an apparatus of the invention.

The exemplifications set out herein illustrate the preferred embodiments of the invention in one form thereof, and such exemplifications are not to be construed as limiting in any manner.

DESCRIPTION OF THE PREFERRED EMBODIMENT

A method for making uniform spheres will be described with reference to FIG. 1. A material from which it is desired to make the spheres is placed in granular form in container 10. A toothed disc 21 is rotated at a constant speed by motor 23 and the toothed disc 21 is heated by heating element 24. The temperature that the disc is heated to depends upon the material from which the spheres are made. The disc must be heated sufficiently to cause the material to melt if a solid material is used. As the material from container 10 is deposited on the rotating disc 21, the heat causes the material to melt and centrifugal force will cause the material to migrate to the teeth around the periphery of toothed disc 21 where the material forms beads or blobs on the teeth. The mass of these beads increases as the bead's radius cubed whereas the surface tension which holds the beads to the rotating disc increases only linearly. Eventually the centrifugal force caused by the rotating disc overcomes the surface tension holding the beads to the disc and the beads are thrown off, forming droplets. These droplets freeze into solid spheres while falling and are gathered by collector 29 which channels them into funnel 31 and into receptacle container 32.

The apparatus of FIG. 1 has a motor 11 connected to a gear box 12. The gear box 12 serves to reduce the speed of motor 11 and also provides increased torque. Gear box 12 drives auger or extruding screw 13 which forces material from container 10 down into container outlet 17. It has been found that rotating the extruding screw 13 between 30 and 60 revolutions per minute seems to produce best results. Motor 11 and gear box 12 are attached to bracket 14. Bracket 14 in turn is attached to support arm 16 as is container 10. This arrangement allows adjustment of extruding screw 13 to insure that the extruding screw is properly positioned to force the material in container 10 down into outlet or nozzle 17. A portion of outlet 17 is surrounded by a heating block 18. Heating block 18 is heated by heating element 19. The heat from heating block 18 is sufficient to cause the material in outlet 17 to sinter and undergo plastic deformation. The action of extruding screw 13 forces this plastic mass down onto rotating disc 21. Rotating disc 21 is heated by heating element 24 so that as the mass is forced down onto disc 21, it melts. As the material melts, it will migrate, due to centrifugal force, to the teeth on the outer periphery of disc 21.

A disc 21 used in one embodiment of the apparatus of FIG. 1 was a portion of a sphere having a diameter of 40 millimeters with a radius of curvature, when cold, of about 40 millimeters. When disc 21 is heated around its periphery, the curvature decreases, however, axial symmetry is preserved. An earlier disc used, was a small steel circular saw blade 0.1 millimeters thick and 22 millimeters in diameter with 90 triangular teeth uniformly spaced along its periphery. A small gas flame under the saw blade was used to heat it sufficiently to melt the material used. However, when the flat circular saw blade was heated around its circumference, it became a surface of negative curvature because of unequal expansion and as a result, axial symmetry was destroyed thereby resulting in non-uniformity in the size of the droplets formed.

Disc 21 is mounted on a shaft 22 which may be made of a nonconductive material so as to avoid overheating the bearings and motor 23. Shaft 22 is in a vertical position to maintain disc 21 in a substantially horizontal position. Motor 23 is surrounded by a shroud 26 which serves as a shield to prevent any droplets thrown off disc 21 from falling into motor 23. Motor 23 rests on pedestal 27 which in turn is supported by tripod 28. As the droplets fall from disc 21 and form spheres they are collected by a conical shaped collector 29. These spheres roll out of an opening in the bottom of collector 29 into funnel 31 which funnels these spheres into a container 32 where the spheres are gathered. Preferably collector 29 should be made of an electrically conductive material to eliminate static electricity. Collector 29 must be placed a sufficient distance from disc 21 to allow the droplets to solidify before landing on the collector.

The apparatus of FIG. 1 has been used for making small magnetizable spherical particles that are suitable for use in a magnetic particle display panel of my above-mentioned copending patent application. The material used in container 10 was comprised of a mixture of magnetic powder and a binder. The binder can be any suitable material such as wax, polyethylene, epoxy, acrylic, glass, thermo plastics, or even some thermo-setting materials. A suitable magnetic powder was found to be Strontium ferrite type EP46 made by Lydall Magnetics of Washington, Indiana. This ferrite powder was found to have all the required properties to make good spheres for use in the magnetic particle display panel. The ferrite powder is very black, nontoxic, nonpoisonous, and available commercially as a very fine powder having an average particles size of 1.6 microns. Some binders that have been used in making the small spherical particles are a Rock Wax 210/220F made by International Wax Refining Company and an AC820A polyethylene made by Allied Chemicals. Better results can be obtained if the material is properly prepared before placing into container 10 of FIG. 1. The binder should first be melted and then mixed with the ferrite powder and molded into slugs. The slugs are then cooled and ground up in a grinder or reduced to a granular consistency. Experimentally, initial use was made of a kitchen blender to grind up the slugs. It is also possible to solidify the binder and ferrite powder into a form convenient for turning into shavings on a lathe. This granular material is then placed into container 10 and forced down into nozzle 17 by the extruding screw 13 where it is sintered by heating block 18 and forced onto rotating toothed disc 21. An alternate method of handling the material was found to be to form the melted mixture of binder and ferrite powder into rods. These solid rods were then pressed directly against the heated rotating disc 21 so that the melted material from the rods formed beads on the teeth of disc 21. As the beads were thrown off of disc 21 they re-solidified into spheres. It should be noted that when material is placed on disc 21 whether by nozzle 17 or in the form of a rod the material is placed near the teeth so that as the melted material flows towards the teeth to form the beads on the teeth, the binder and ferrite powder do not have an opportunity to settle or separate out. If the material were placed closer to the center of disc 21 then as the melted material flowed towards the teeth, it would be possible for the binder and the ferrite powder to separate prior to the material reaching the teeth. The binder and ferrite powder or filler form a composite material, and this apparatus and method provide for making small particles from the composite material without encountering a separation or settling of materials. This invention provides for making every particle of substantially the same density and for making particles of a desired density.

In an initial embodiment, a soldering iron was found to perform satisfactorily as heating element 19 to heat heating block 18. The soldering iron used was designed to provide 25 watts at 115 volts AC. It was found that when using rock wax 210/220F that the heating element 19 only had to be energized during the initial start up cycle of the apparatus. However, when polyethylene AC820A was used as a binder the heating element was needed during the continuous operation of the apparatus, but it was found that the soldering iron supplied sufficient heat when powered at 70 volts AC. It should be understood that nozzle 17 is not a capillary tube; a nozzle having a diameter of one eighth inch was found to perform satisfactory.

As the material comes in contact with the heated rotating toothed wheel or disc, the material will form beads on the teeth of the wheel and as the bead grows the centrifugal force F acting on the bead increases as the cube of the bead's radius r whereas the force due to surface tension which keeps the bead attached to the wheel increases linearly. Therefore, as the bead grows, the centrifugal force will eventually overcome the surface tension and the bead will pinch off and become detached. Assuming that the bead is hemispherical on the side away from the wheel at the moment when pinching off begins to occur then the balance of forces is described by the following equation:

$$2\pi rT = F = \tfrac{2}{3}\pi r^3 \rho \omega^2 R$$

where T is the surface tension, $\rho$ is the density, $\omega$ is the angular velocity and R the distance from the axis of rotation. It should be noted that this equation neglects the effects of viscosities and accelerations other than centripetal. By solving for the bead's radius r in the above equation we obtain:

$$r = \sqrt{\frac{3T}{\omega^2 R \rho}}$$

The droplets formed from the bead becomes somewhat smaller when the droplet pinches off. Therefore, the calculated radius of the solidified spheres would be a little larger than the actual radius of the spheres themselves. For one material used and a particular set of parameters the radius was calculated to be approximately 90 microns which was about twice that of the average solidified spherical particles produced. This correlation between calculated radius and actually produced radius is sufficiently close to support the use of this analysis for estimating the size of the spherical particles since it is the same order of magnitude. The analysis shows that magnetic spherical particles as small as ten microns in diameter can be produced with this method simply by increasing the speed of rotation of the toothed disc or by using a larger diameter toothed disc. The pinch off size is determined principally by the surface tension and centrifugal force, therefore the size is quite uniform. By rotating the disc at a constant speed the centrifugal force remains constant. Where it is not necessary to have all particles of a uniform size, then it is not necessary to have a constant speed motor to spin the disc.

Figure 2:
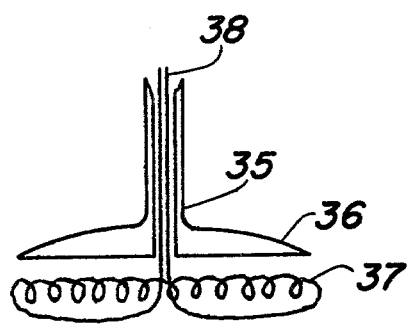
FIG. 2 is a cross sectional view of the toothed disc having an integral shaft and heating means for the toothed disc.

Referring to FIG. 2, there is illustrated an alternate configuration of a toothed disc that could be used. In this configuration, toothed disc 36 is attached to a hollow shaft 35. The purpose for using the hollow shaft is to permit the passing of wires 38 from heating element 37 through the hollow shaft. In this configuration, it is intended that motor 23 of FIG. 1 would be placed above the rotating toothed disc. The configuration of FIG. 2 where the toothed disc 36 and hollow shaft 35 are made as one integral unit it would be possible to incorporate heating element 37 within toothed disc 36.

Figure 3:
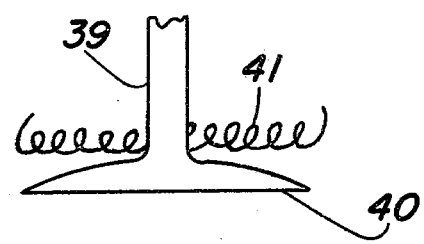
FIG. 3 illustrates another embodiment of a tooth disc and integral shaft and heating means therefore.

FIG. 3 is a side view of another arrangement of a heating element and a toothed disc. Here, heating element 41 is placed above toothed disc 40. However, it should be noted that heating element 41 is placed near the outer periphery of toothed disc 40 and the material from which spherical particles are to be formed will be placed on toothed disc 40 between heating element 41 and shaft 39. The teeth on the toothed disc should be tapered to facilitate formation of the beads on the teeth. Although it is preferable to have teeth on the rotating or spinning disc, it will be appreciated by those skilled in the art that particles can be formed by using a disc in the manner described herein without teeth. However, particles formed from such a toothless disc will most likely not be as uniform in size. These are applications wherein it is not necessary to have all particles of a uniform size.

Figure 4:
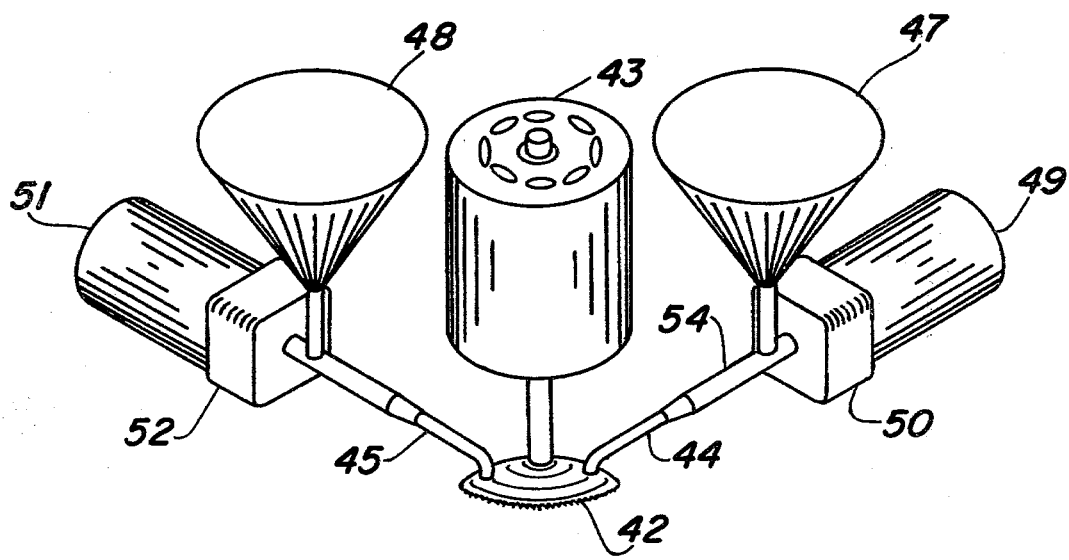
FIG. 4 illustrates another arrangement of a portion of the apparatus of FIG. 1.

FIG. 4 illustrates in schematic form an alternate arrangement of a spinning toothed disc. In this configuration, a power means such as motor 43 is placed above toothed disc 42. Two nozzles 44 and 45 are used to deposit or place material onto toothed disc 42. The use of more than one nozzle to place material onto a rotating toothed disc increases the rate of production of solid spherical particles. The material from which the particles are to be made is placed in containers 47 and 48. An alternate arrangement would be to provide one large container having more than one outlet positioned around the disc. Motor 49 powers gear box 50 which drives an extruding screw within passage way 54. The extruding screw moves the material from container 47 down to nozzle 44 forcing it onto rotating disc 42. Motor 51 is used to power gear box 52 which drives an extruding screw that moves the material from container 48 into nozzle 45. This arrangement of motor 43 and toothed disc 42 is preferable to the arrangement shown for motor 23 and toothed disc 21 in FIG. 1 because motor 43 can be attached to the same support arm as motor 51, gear box 52, and motor 49, gear box 50. Such an arrangement would eliminate an alignment problem that could occur with the arrangement of FIG. 1 if tripod 28 is accidentally moved. In addition, this arrangement eliminates the need for a protective shroud over the motor and permits a simpler design of the collector means to collect the particles as they fall from toothed disc 42 and form into spheres. Some materials from which particles are to be made do not require heating nozzle 44, 45. These materials are sufficiently heated by friction as they are extruded through the nozzle. Although heating means are not shown in FIG. 4, it will be understood that it is necessary to heat the periphery of disc 42.

There is more than one way to implement in-flight solidification of the droplets. One embodiment described herein uses heat to melt the binder material so the droplets initially are comprised of a suspension of the finely-powdered solid filler material in the molten binder (the suspension as a whole behaves like a liquid). Solidification occurs when the droplets are cooled below the freezing point of the binder during free-fall. An alternative embodiment might use droplets of a material dissolved in a volatile solvent. The solution would be a liquid. It might furthermore contain solid fillers in suspension. The suspension would still behave like a liquid. Soldification takes place when the solvent evaporates in flight. Still another embodiment might use a liquid material (with or without solid fillers) that becomes solid by chemical reactions. The chemical reaction might involve only the binder material, an example of this case is an epoxy resin with catalyst. Some polymerizing materials (e.g. silicone rubbers) might react with the surrounding air, others might even react with the filler. There are furthermore numerous combinations of these various embodiments. A well-known example is the drying of paint, which is both evaporation of solvent and polymerization.

This invention can also be practiced in making particles for electrophoretic displays where small white particles of very uniform density are needed. Particles of polythylene with a titanium dioxide filler, for example, can be made by the practice of this invention. The density can be accurately formulated in mixing the bulk material before grinding it up for feeding into the particle-making apparatus. The uniformity of the particle's density can be assured because the mixture of polyethylene and titanium dioxide exists in the liquid state for only a very short time on the spinning disc; this minimizes the chances for the solid titanium dioxide powder to settle out of the suspension.

Where the final composition of the particle is not critical, a filler and binder can be mixed in container 10, 47, 48, thereby eliminating the steps of melting and pre-mixing the filler and binder, allowing the mixture to solidify, and then grinding up the solidified mixture prior to placing the mixture in container 10, 47, 48.

By now it will be appreciated that I have provided an apparatus simple in design and operation that produces substantially perfect spherical particles. The apparatus can be fabricated from readily available components. By knowing or determining the surface tension and density of the material from which the spherical particles are to be made, the angular velocity at which a toothed wheel is rotated, and the distance from the axis of rotation of the teeth, the diameter of the particles to be made can be easily estimated. With this apparatus, small spheres can be easily made. The apparatus does not contain capillary tubes to get clogged up. In addition, the material from which the particles are to be made exists as a liquid, during the process, for a very short period of time to minimize settling.

Droplets leaving the rotating disc initially may not be spherical in shape, they generally would be in the shape of a spheroid or a pear. The droplet will usually oscillate between an oblate and a prolate spheroid. This oscillation will be damped out by viscosity, then the droplet becomes spherical. In order to generate spherical particles, the droplets must remain in the liquid state for a long enough time for the initial oscillations to substantially dampen out. It will therefore be appreciated that a spheroid shaped particle can be made merely by using a material that solidifies before the droplet becomes spherical in shape.

Consequently, while in accordance with the Patent Statutes, I have described what at present are considered to be the preferred forms of my invention it will be obvious to those skilled in the art that numerous changes and modifications may be made herein without departing from the spirit and scope of the invention, and it is therefore aimed in the following claims to cover all such modifications.

What I claim as new and desire to secure by Letters Patent of the United States is:

1. Apparatus for making substantially spherical particles of uniform size from a material, comprising: a rotatable wheel having at least one convex side adapted to receive the material, said wheel having a plurality of tapered teeth formed about the periphery thereof and extending radially therefrom; means to rotate said wheel at a predetermined constant speed; heating means to heat said wheel so that the material melts when coming in contact with said convex side of said wheel and forms beads on said teeth as said wheel is rotated; and a receptacle placed a predetermined distance from said wheel to receive solidified droplets formed from beads leaving said wheel, the droplets forming substantially spherical particles and solidifying while falling from said wheel to said receptacle.

2. An apparatus for making generally spherical particles of uniform size from a solidified material, comprising: a rotatable disc having at least one convex side adapted to receive the material, said disc having a plurality of tapered teeth formed about the periphery thereof and extending radially therefrom; drive means to rotate said disc at a constant speed, said drive means having a substantially vertical output shaft upon which said disc is mounted; means to apply heat to said disc so that the material will be maintained in a flowable state when in contact with said disc thereby permitting the material to form beads on said teeth of said disc as centrifugal force created when said disc rotates causes the material to migrate to said teeth on the outer periphery of said disc and then spin off said teeth; and receptacle means placed a distance from said disc to catch the material as it falls from said disc, the distance being sufficient to allow the material to solidify prior to reaching said receptacle.

3. Apparatus for making substantially spherical magnetizable particles of uniform size from a mixture of magnetic powder and a binder, comprising: a container to contain the mixture, said container having an outlet; a wheel positioned adjacent said outlet to receive any mixture leaving said outlet, said wheel having at least one convex side adapted to receive the mixture and having a plurality of tapered teeth formed about the periphery thereof and extending radially therefrom; first heating means to heat said wheel so that as the mixture is deposited on said wheel the mixture will melt and migrate to the outer periphery of said wheel as said wheel rotates; drive means connected to said wheel to rotate said wheel, the rotation of said wheel causing beads of the mixture that form on said teeth to be thrown off said wheel; and a receptacle to collect droplets formed from the beads as the beads fall from said teeth, said receptacle being positioned a distance from said wheel thereby permitting the droplets to solidify into substantially spherical particles prior to reaching said receptacle.

4. The apparatus of claim 3 further including an extruding screw positioned within the container to ensure a continuous feed of mixture into the outlet.

5. The apparatus of claim 3 further including a second heating means to provide heat to said outlet to cause the mixture to sinter while passing through a nozzle.

6. The apparatus of claim 3 further including a plurality of containers positioned to deposit the mixture in a corresponding number of locations on said wheel.

7. The apparatus of claim 3 wherein said container has a plurality of outlets positioned so as to deposit mixture on said wheel in a corresponding plurality of locations.

8. A method of making substantially spherical particles of uniform size from a material, comprising: rotating a toothed disc at a constant speed; heating said toothed disc to a predetermined temperature; depositing the material on a convex side of the heated toothed disc, the material melting and migrating to tapered teeth formed about the periphery of said disc and extending radially therefrom and forming beads on said tapered teeth; and collecting droplets formed from the beads that have been thrown off said toothed disc, the collecting occuring at a predetermined distance from said toothed disc, the predetermined distance being sufficient to allow the droplets to solidify into spherical particles prior to being collected.

9. A method of making substantially spherical particles of uniform size from a material, comprising: rotating a toothed disc with a substantially vertically positioned drive shaft; heating said toothed disc to a predetermined temperature; bringing into contact with at least one convex side of said heated toothed disc a solid material, whereby the heat causes the solid material to melt and flow along said disc, rotating said toothed disc creating centrifugal force which causes beads of the material to form on tapered teeth formed about the periphery of said disc and extending radially therefrom, the beads being eventually thrown off forming substantially spherical droplets which cool off during the fall and re-solidify into spherical particles.

10. A method of making generally spherical particles of uniform size from a solid meltable material, comprising: spinning a toothed disc about a substantially vertical axis that passes through the center of the disc; heating the spinning disc to a predetermined temperature so that the solid meltable material will melt upon contact with said spinning disc; and bringing the solid meltable material into contact with at least one convex side of said heated spinning disc so that the material will melt and migrate toward tapered teeth formed about the periphery of said disc and extending radially therefrom and form beads on said teeth, the beads falling off due to centrifugal force and forming generally spherical particles as droplets formed from the beads fall and re-solidify.

11. The method of claim 10 further including spinning said toothed disc at a constant speed to assist in assuring making a substantially uniform size of spherical particles.

12. The method of claim 10 further including mixing a ferrite powder with a binder to make the solid meltable material.

13. A method of making generally spherical magnetizable particles of uniform size, comprising: mixing a magnetic powder with a binder; solidifying the mixture of magnetic powder and binder; spinning at a constant speed a toothed disc; heating said toothed disc sufficiently to cause the solidified mixture to flow freely when brought in contact with at least one convex side of said toothed disc; and bringing the solidified mixture into contact with said toothed disc so that as said disc rotates the mixture migrates to tapered teeth formed about the periphery of said disc and extending radially therefrom, and spins off said teeth forming generally solidified spherical particles as the mixture falls.

14. The method of claim 13 further including grinding up the solidified mixture prior to depositing said mixture on the toothed disc.

15. A method for making small spherical particles of uniform size from a solidified material, comprising: grinding the solidified material into granular form; placing the granular form material in a container having an outlet; passing the material through said outlet; heating the material in said outlet sufficently to cause the granular material to sinter; and bringing the material into contact with at least one convex side of a heated, rotating disc as the material leaves said outlet, said heated disc causing the material to melt and centrifugal force from said rotating disc causing the melted material to migrate to tapered teeth formed on the outer periphery of said disc and extending radially therefrom where the material forms beads on said teeth and spins off forming droplets that solidify into small spherical particles.

* * * * *